(12) United States Patent
Meng et al.

(10) Patent No.: US 7,497,952 B2
(45) Date of Patent: Mar. 3, 2009

(54) METHODS OF PREPARING A SURFACE-ACTIVATED TITANIUM OXIDE PRODUCT AND OF USING SAME IN WATER TREATMENT PROCESSES

(75) Inventors: Xiaoguang Meng, Highland Park, NJ (US); Mazakhir Dadachov, Mahopac, NY (US); George P. Korfiatis, Basking Ridge, NJ (US); Christos Christodoulatos, Basking Ridge, NJ (US); David J. Moll, Midland, MI (US); Geofrey Paul Onifer, Sanford, MI (US); Daniel B. Rice, Shepherd, MI (US); Robert E. Reim, Midland, MI (US); Fredrick W. Vance, Freeland, MI (US); Harlan Robert Goltz, Midland, MI (US); Chan Han, Midland, MI (US); William I. Harris, Midland, MI (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 539 days.

(21) Appl. No.: 11/176,586

(22) Filed: Jul. 7, 2005
(Under 37 CFR 1.47)

(65) Prior Publication Data

US 2006/0091078 A1    May 4, 2006

Related U.S. Application Data

(63) Continuation-in-part of application No. 10/304,550, filed on Nov. 26, 2002, now Pat. No. 6,919,029.

(60) Provisional application No. 60/357,051, filed on Feb. 14, 2002.

(51) Int. Cl.
*C02F 1/28* (2006.01)
*C01G 23/047* (2006.01)

(52) U.S. Cl. .................. 210/665; 210/681; 423/610

(58) Field of Classification Search ................ 210/665, 210/681; 423/610, 611, 612
See application file for complete search history.

(56) References Cited

U.S. PATENT DOCUMENTS

| | | | |
|---|---|---|---|
| 5,189,092 A | 2/1993 | Koslow | |
| 5,331,037 A | 7/1994 | Koslow | |
| 5,821,186 A * | 10/1998 | Collins | ................ 502/8 |
| 5,997,829 A | 12/1999 | Sekine et al. | |
| 6,719,869 B2 | 4/2004 | Koslow | |
| 6,797,167 B2 | 9/2004 | Koslow | |
| 2001/0016264 A1 | 8/2001 | Ohmori et al. | |
| 2004/0178142 A1 | 9/2004 | Koslow | |
| 2006/0091079 A1 | 5/2006 | Meng et al. | |

OTHER PUBLICATIONS

Non-final Office Action dated Jul. 17, 2008, received in U.S. Appl. No. 11/181,681.
Applicants' response to non-final Office Action dated Jul. 17, 2008, received in U.S. Appl. No. 11/181,681.

* cited by examiner

*Primary Examiner*—Robert A Hopkins
(74) *Attorney, Agent, or Firm*—Greenberg Traurig, LLP

(57) ABSTRACT

A method for removing dissolved contaminants from solution using a surface-activated crystalline titanium oxide product having a high adsorptive capacity and a high rate of adsorption with respect to dissolved contaminants, in particular, arsenate and arsenite. Preferably, the titanium oxide product includes crystalline anatase having primary crystallite diameters in the range of 1-30 nm. The surface-activated titanium oxide is combined with other filter media to further improve the removal of dissolved contaminants.

18 Claims, 8 Drawing Sheets

METHODS OF PREPARING A SURFACE-ACTIVATED TITANIUM OXIDE PRODUCT AND OF USING SAME IN WATER TREATMENT PROCESSES

CROSS-REFERENCE TO RELATED APPLICATION

This application is a continuation-in-part of U.S. patent application Ser. No. 10/304,550, filed on Nov. 26, 2002, now U.S. Pat. No. 6,919,029, and which claims the benefit of U.S. Provisional Patent Application No. 60/357,051, filed on Feb. 14, 2002.

FIELD OF INVENTION

The present invention relates to products and methods for removing dissolved contaminants from aqueous and organic streams. More particularly, the present invention relates to methods of removing dissolved inorganic contaminants from aqueous streams using a surface-activated crystalline titanium oxide product as an adsorbent. The method is non-photocatalytic, and does not require irradiation for the removal of contaminants. In addition, the present invention allows removal of inorganic contaminants in streams containing 50% (w/w) or more of an organic material, such as ethylene glycol.

The method of the present invention makes use of adsorbent materials described in U.S. Pat. No. 6,919,029. The surface-activated crystalline titanium oxide product of this invention can be in the form of a powder, or mixed with a binder to form an agglomerate or granule. The agglomerate may be further processed by grinding, extruding, or combining with other filter media. The surface-activated crystalline titanium oxide product can also be incorporated into a paper or sheet. Such papers or sheets can be further processed into a pleated filter, a spiral wrapped filter, or a carbon block wrap layer.

BACKGROUND OF INVENTION

Wastewater and natural waters (e.g., surface water or groundwater) may contain a variety of dissolved inorganic substances from natural and anthropogenic sources. Regulatory limits have been set for a number of these substances in drinking water and for discharges to natural waters, for protection of public health and of environmental quality. The regulatory limits for many of these substances are set at very low levels, e.g., in the range of 2-50 parts-per-billion ("ppb") or the equivalent units of measure of micrograms-per-liter ("$\mu g/L$").

Conventional water treatment processes, such as co-precipitation with iron or aluminum salts, lime softening, or filtration using adsorbents or ion exchange resins, are ineffective in removing some of these regulated substances to the mandated levels. This problem is of particular concern with respect to certain types of substances including oxyanions, particularly arsenate and arsenite, and some metals, such as mercury, because of their chemistry in water and the particularly low regulatory limits that have been set for them. Typically, the removal of such contaminants can be improved by selecting a treatment matrix (e.g., a co-precipitant or adsorbent) that exhibits a greater capacity to sequester or retain the dissolved substance of concern, or provides more favorable kinetics toward that substance (i.e., the treatment reaction proceeds more quickly). The low capacity or unfavorable kinetics of a treatment matrix can be accommodated to some extent by construction of larger treatment systems to allow the use of larger quantities of the treatment matrix or to provide longer contact times between the treatment matrix and solution undergoing treatment. The costs of building and operating such a system increase with the size of the system and often cause such an accommodation to become uneconomical.

U.S. Pat. No. 6,383,395 discloses the use of powdered titanium hydroxide, packed in a column or applied to a filter in the form of a paste, to remove dissolved oxyanions, particularly arsenate, from water.

U.S. Pat. No. 3,332,737 discloses the use of hydrous titanium oxides in packed columns to adsorb several dissolved metals. The hydrous titanium oxides are prepared by treating a solution of a hydrolysable titanium compound with aqueous ammonia or hydrogen peroxide.

Japanese Patent Application Publication 58-45705 discloses the use of hydrous titanium oxides in slurries to remove oxyanions, such as arsenate, from water at concentrations in the parts-per-billion (ppb) range. The hydrous titanium oxide adsorbent is prepared from a precipitate of a hydrolyzed titanium salt. Japanese Patent Application Publication 58-45705 teaches that the kinetics of adsorption are relatively slow, and that a contact time roughly five times as long is required to remove the same amount of arsenate from solution in the absence of certain non-oxygenated acidic anions, such as chloride or sulfide, as when the acidic ions are present.

Japanese Patent Application Publication 53-122691 discloses the preparation and use of a composite adsorbent comprising a granular activated carbon and hydrous titanium oxides. The composite adsorbent is prepared by boiling the granular activated carbon in a concentrated solution of a titanium salt in the presence of an oxidative acid, then washing and air-drying the resulting composite adsorbent.

Powdered agglomerate or granulate can be formed into various flat sheets or composite filter media. Examples of flat sheets are taught, for example, in U.S. Pat. No. 5,997,829; U.S. Pat. No. 6,719,869; or U.S. Pat. No. 6,797,167. A newer form of flat sheet is an integrated paper formed with nanofibers in a wet laid paper-making process, taught in U.S. Publication No. 2004/0178142 A2. The surface-activated titanium oxide product of the present invention imparts improved heavy metal removal over prior art titanium oxides.

SUMMARY OF THE INVENTION

This invention comprises a method for removing dissolved inorganic contaminants from a solution using a surface-activated crystalline titanium oxide product. A preferred embodiment uses surface-activated crystalline titanium oxide product made by preparing a titanium oxide precipitate from a mixture comprising a hydrolysable titanium compound and heating the titanium oxide precipitate at a selected temperature of less than 300° C.; preferably, a temperature between about 100° C. and 150° C.; or, more preferably, a temperature of about 105° C. The preferred method of preparing the surface-activated crystalline titanium oxide precipitate does not include a calcining step.

In another preferred embodiment of the method, the surface-activated crystalline titanium oxide product is a nano-crystalline anatase. The nano-crystalline anatase is a titanium oxide product having anatase crystals with mean primary crystallite diameters within the range of about 1 nm to about 30 nm; preferably, within the range of about 1 nm to about 10 nm. Dissolved inorganic contaminants to be removed from the dilute aqueous include antimony, arsenite, arsenate, cadmium, chromium, copper, lead, mercury, tungsten, uranium, and zinc, and low-molecular weight organic arsenic compounds, such as monomethylarsonic acid, dimethylarsinic acid, or phenylarsonic acid. The surface-activated crystalline titanium oxide product, preferably comprising a nano-crystalline anatase, may be in a powdered form, in a granular form comprising one or more binders, in the form of a coating on a substrate, or in other forms that will be obvious to those having ordinary skill in the relevant arts.

Another aspect of the invention comprises a method for preparing a packed bed with surface-activated crystalline titanium oxide product to remove dissolved inorganic contaminants from a solution. The diluted steam is filtered through the bed and the surface-activated crystalline titanium oxide product adsorbs the contaminants. A preferred form of the surface-activated crystalline titanium oxide product is agglomerated or granulated using a binder such as a thermoplastic polymer, a thermosetting polymer, silicate, latex, or a polyvinyl acetate. The rate of removal of impurities for the preferred agglomerate or granulate surface-activated crystalline titanium oxide product is improved over comparable iron-based media.

Another aspect of the invention is the addition of the surface-activated crystalline titanium oxide product into other materials, devices, or forms, such as blocks, films, sheets, papers or honeycombs. Products made by such additions have been shown to be more effective in removing dissolved contaminants than the agglomerated or granulated adsorbent alone.

Another aspect of the invention is the use of surface-activated crystalline titanium oxide for removal of inorganic materials, especially heavy metals, from streams containing more than about 50% w/w of one or more organic compounds. The surface-activated crystalline titanium oxide thus is useful for cleaning glycol coolants or industrial waste streams.

DETAILED DESCRIPTION OF THE INVENTION

Figure 1:
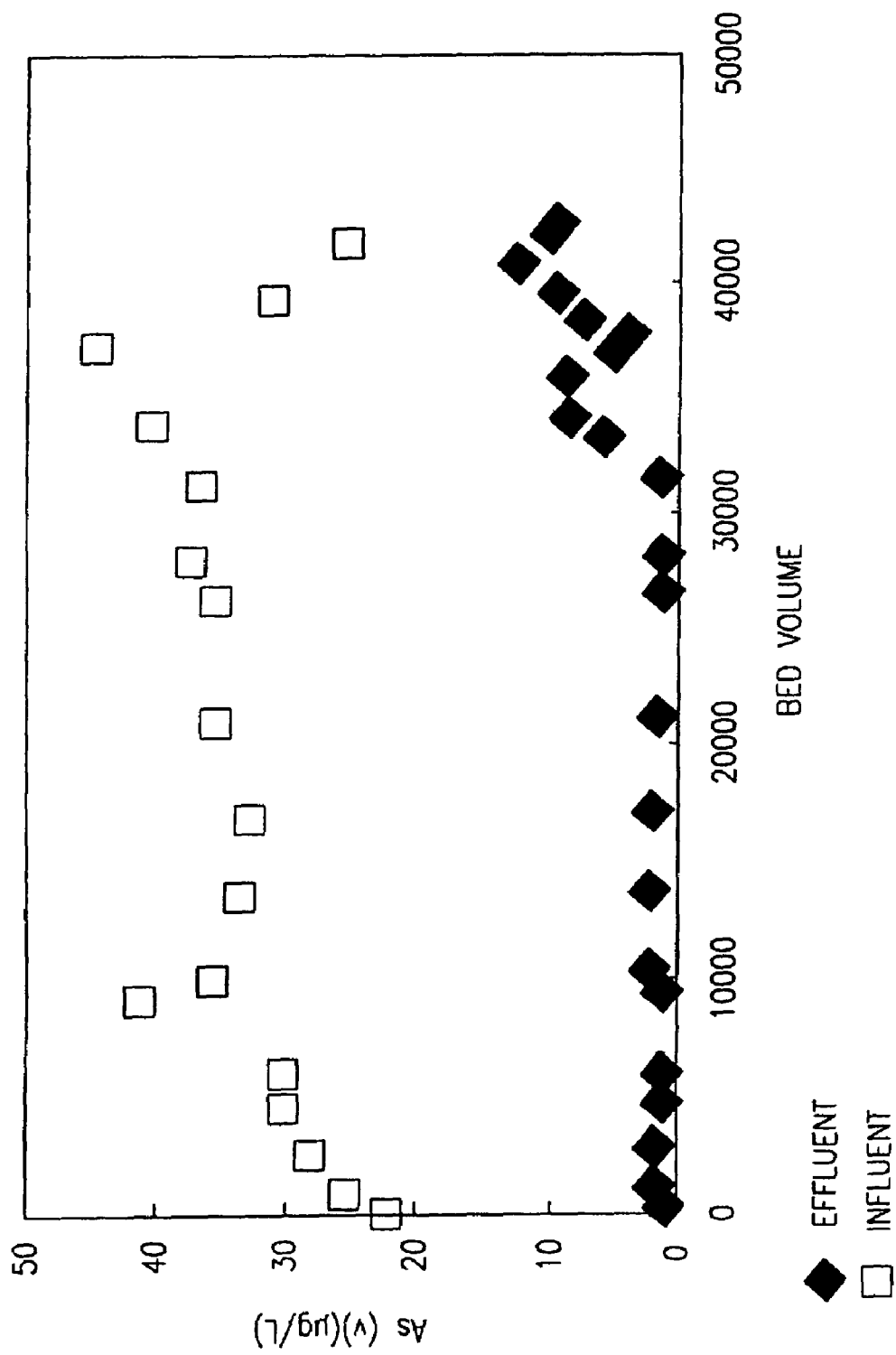
FIG. 1 is a graph showing the changes in influent and effluent concentrations of arsenic over the number of bed volumes of an aqueous stream filtered through a packed column of nano-crystalline anatase prepared according to the present invention.

The present invention comprises methods for producing surface-activated crystalline titanium oxide products, and methods for using such products to remove dissolved inorganic substances from water. The term "surface-activated" refers to the high adsorptive capacities and favorable adsorption kinetics of the titanium oxide products, which lead to high rates of removal for dissolved arsenate, arsenite, low-molecular weight organic arsenic compounds, metals such as lead, and other dissolved inorganic substances. The "titanium oxide" of the present invention may be primarily, comprised of titanium dioxide; however, hydrous titanium oxide or other titanium oxides and hydroxides may be present in the product.

The primary commercial use of titanium dioxide is as a white pigment in a wide range of products. The pigments generally contain one of the two primary crystalline forms of titanium dioxide, anatase and rutile. Both of these forms have the chemical composition $TiO_2$, but have different crystalline structures. Industrial processes that produce anatase and rutile typically use a sulfate process. A chloride process is also used for commercial production of rutile. Although it is not impossible to obtain anatase by a chloride process, the thermodynamics of the process make it significantly more applicable to the production of rutile.

Additional uses of hydrous titanium oxides include photocatalytic processes, including removal of contaminants by photocatalysis, wherein the photcatalyst is irradiated. The process of the present invention does not require irradiation for removal of metals such as arsenic and lead.

Preferred surface-activated titanium oxide products and a method for making them are described in U.S. Pat. No. 6,919,029. In the method, a surface-activated crystalline titanium oxide product is produced from the hydrolysis of a hydrolysable titanium compound such as titanium sulfate, followed by precipitation of the resulting titanium oxide. The conditions of precipitation are controlled so that the precipitate can be easily filtered and washed, to produce crystals having the desired crystal structure and crystallite size. The washing step removes soluble metal salts that may remain in the product and reduces any acid content (e.g., sulfuric acid) of the resulting slurry.

The titanium oxide slurry from the separation and washing steps is treated with a neutralizing agent such as sodium hydroxide to adjust its pH toward 7. The neutralized titanium oxide contains salts, typically sulfates, which fill a portion of the pore space of the titanium oxide solids, but which may be removed by washing the solids with water or with a dilute acid to improve the adsorptive properties of the surface-activated crystalline titanium oxide product. The solids are then dried under air or steam at a selected temperature between about 50° C. and about 300° C. The drying temperature is selected to produce a product containing titanium oxide crystals having a desirable crystallite diameter and surface activity, which may be expressed as the number of available surface hydroxyl groups per mass of titanium oxide. Smaller crystallite diameters, preferably in the nano-crystallite range of 1-30 nm, or, more preferably, between about 1 nm and about 10 nm, are achieved at the lower drying temperatures. The selected drying temperatures are maintained for 2 hours or less, producing a surface-activated titanium oxide product comprising functional nano-crystalline titanium oxide. The drying stage of the present invention differs from a calcination stage that is typically present in processes for producing titanium oxide catalysts or pigments. The temperature of the drying stage of the present invention is selected to remove free water from the product, while the temperature of the typical calcination stage is selected to drive off sulfur oxides and other residues that may be bound to the product. Drying the product at temperatures higher than 300° C. dramatically impairs the adsorptive properties of the surface-activated crystalline titanium oxide product. No calcination stage is present in the methods, disclosed herein, of producing surface-activated crystalline titanium oxide products.

In general, a surface-activated crystalline titanium oxide is produced by adding water to a hydrolysable titanium compound (e.g., to form an aqueous solution of the hydrolysable titanium compound) and maintaining the resulting mixture at a temperature between about 50° C. and about 180° C. for a period of about 2 hours or longer. A more preferred temperature range is between about 80° C. and about 120° C. The selection of an optimum temperature for hydrolysis within these ranges depends on the hydrolysable titanium compound used as a starting material and the desired crystallite diameter of the precipitate after drying. For example, a solution of titanium oxysulfate may be maintained at a temperature between about 80° C. and about 110° C. to produce a precipitate that has a crystallite diameter between about 6 nm and about 8 nm after drying. Under some conditions, the titanium oxide will precipitate in an amorphous form (e.g., as a gel) rather than in a crystalline form. The amorphous product may be dried to form the surface-activated crystalline titanium oxide and washed subsequently, if desired.

Other surface-activated crystalline titanium oxide products also may be produced in accordance with the present invention. For example, a particulate substrate, such as granular activated carbon or alumina, may be coated with a surface-activated crystalline titanium oxide by contacting the particulate substrate with the mixture of the hydrolysable titanium compound and water under controlled conditions to precipitate the titanium oxide onto the surface or into the pores of the particulate substrate. For another example, the dried surface-activated crystalline titanium oxide product may be powdered, and the powder reconstituted in a granular form with one or more binders. This reconstitution would facilitate the formation of granules having selected adsorptive and/or structural properties. Preferred binders for the surface-activated crystalline titanium oxides of the present invention include silicates, cellulosic polymers, vinyl polymers, thermoplastic binders, thermoset binders, and water. More preferred binders include latex, sodium silicate, hydroxyethyl cellulose, polyvinyl alcohol and polyvinyl acetate.

As disclosed in the Examples below, the surface-activated crystalline titanium oxide product of the present invention has a high adsorptive capacity and favorable adsorption kinetics for removing oxyanions, such as arsenate and arsenite, dissolved metals, and some low-molecular weight organic compounds at low concentrations in water, which properties lead to high rates of removal for those substances. The surface-activated crystalline titanium oxide product may be used to substantially reduce the concentrations of such substances to concentrations below a few micrograms-per-liter (µg/L). Substances which may be effectively adsorbed by a surface-activated crystalline titanium oxide product include aluminum, antimony, arsenic(I), arsenic(V), barium, cadmium, cesium, chromium, cobalt, copper, gallium, gold, iron, lead, manganese, mercury, molybdenum, nickel, platinum, radium, selenium, silver, strontium, tellurium, tin, tungsten, uranium, vanadium, zinc, nitrite, phosphate, sulfite, sulfide, and low-molecular weight organic arsenic compounds, such as monomethylarsonic acid, dimethylarsinic acid and phenylarsonic acid. In particular, the surface-activated crystalline titanium oxide product is effective in adsorbing arsenite (As (III)), arsenate (As(V)) and the dissolved metals antimony, cadmium, chromium, copper, lead, mercury, tungsten, uranium and zinc. The removal of arsenite does not depend on the arsenic being in ionic form. The product of this invention adsorbs arsenite in a pH range of about 1 to 9, where the arsenite is typically in a protonated nonionic form as $H_3AsO_3$. The ability to adsorb in a neutral aqueous stream in a pH range from about 6.5 to 8.5 is important in removing arsenite from drinking water. Arsenite removal is especially important for the purification of groundwater. Groundwater is herein defined as water originating or derived from underground sources. Arsenic present in this water is often in the arsenite form because it has not yet been oxidized to the arsenate form.

The preferred methods of making surface-activated crystalline titanium oxide consistently produce a product that consists predominantly, if not entirely, of anatase crystals having crystallite diameters in the range of about 1 to about 30 nm. For the purposes of reference and discussion, such titanium oxide products will be referred to hereinafter as "nano-crystalline anatase" products.

The nano-crystalline anatase product of this invention may be agglomerated with an inorganic binder, such as a silicate or a latex binder. The agglomerated product can be then used in a filtration column in a packed bed. A packed bed of the agglomerated product has improved kinetics and lower pressure drop when used in a column than iron oxide based media in deep beds. The size of agglomerated product can vary. A preferred particle size for packed beds is specified as having greater than 90% of the agglomerate by weight retained in a 60 U.S. mesh (0.25 mm) screen The agglomerated product, or a finer sized granulate powder, may be added to other materials or devices, including, but not limited, to carbon block and flat sheets made from materials such as cellulosic polymers, other polymers, or nanofibers. The addition of the titanium oxide product of the present invention to such materials or devices improves their performance in removing heavy metals. When added to carbon block filters, the surface-activated titanium oxide product has superior lead removal properties, in comparison to amorphous titanium silicate.

Powdered agglomerate or granulate nano-crystalline anatase can be formed into various flat sheets or composite filter media. Examples of flat sheets are taught, for example, in U.S. Pat. No. 5,997,829; U.S. Pat. No. 6,719,869; or U.S. Pat. No. 6,797,167, the disclosures of which are hereby incorporated for reference. A newer form of flat sheet is an integrated paper formed with nanofibers in a wet laid paper-making process, taught in U.S. Publication No. 2004/0178142 A2, the disclosure of which is hereby incorporated by reference. The surface-activated titanium oxide product of the present invention imparts improved heavy metal removal over prior art titanium oxides, in addition to the feature taught in U.S. Publication No. 2004/0178142 A2.

Dissolved inorganic substances may be removed from a solution by contacting the solution with a surface-activated crystalline titanium oxide product for a period of time. Preferably, the surface-activated crystalline titanium oxide product comprises a nano-crystalline anatase, which material is particularly effective in removing arsenic and dissolved metals from water, as disclosed in the Examples. For convenience, the following methods of removing dissolved inorganic substances from water are discussed with respect to the use of nano-crystalline anatase. However, any surface-activated crystalline titanium oxide product may be used according to the methods of the present invention.

A solution may be contacted with a nano-crystalline anatase product by known water treatment processes, e.g., suspending a powdered nano-crystalline anatase in a batch or a stream of contaminated water for a period of time, then separating the nano-crystalline anatase solids from the water, or by filtering the solution through a bed or column of the nano-crystalline anatase product. The nano-crystalline anatase product used in water treatment processes may be in a powdered or granular form; it may be dispersed in a bed of a particulate substrate; or it may adhere to the surface or be within the pores of a particulate substrate such as granular activated carbon or porous alumina.

The hydrolysable titanium compounds preferred for use include the following inorganic compounds: titanium trichloride, titanium tetrachloride, titanyl sulfate, titanium sulfate, titanium oxysulfate, titanium iron sulfate solution, and titanium oxychloride. Titanium alkoxides may also be used, such as, titanium ethoxide, titanium ethylhexoxide, titanium isobutoxide, titanium isopropoxide, titanium isopropylate or titanium methoxide.

As demonstrated by the Examples provided, the surface-activated crystalline titanium oxide product of the present invention provides a high degree of removal for the dissolved inorganic substances tested. In particular, the product removes more than 95% of the metals tested from dilute aqueous solutions. Moreover, the surface-activated crystalline titanium oxide product exhibits a high adsorptive capacity and favorable kinetics of adsorption toward arsenate and arsenite in dilute aqueous solutions, reducing the concentration of those substances by about 80% with contact times on the order of 1 to 2 minutes. The surface-activated crystalline titanium oxide product can be produced from an intermediate slurry that is routinely generated in commercial titanium oxide production. Alternatively, it may be produced from any of a number of commercially available titanium compounds.

The effectiveness of surface-activated crystalline titanium oxide, and specifically nano-crystalline anatase, in removing arsenate, arsenite and other dissolved inorganic substances from water is an unexpected result in view of the conventional understanding that the adsorption capacity of a metal oxide is controlled by the availability of hydroxyl groups on the surface of the metal oxide product (see, e.g., U.S. Pat. No. 5,618,437, col. 4, lines 26-30, and U.S. Pat. No. 6,383,395, col. 7, lines 49-53). However, a hydrous or amorphous titanium hydroxide should have a greater number of available hydroxyl groups than a crystalline titanium oxide and, therefore, would be expected to exhibit a greater adsorptive capacity according to the conventional understanding.

Example 6 demonstrates that, contrary to this expectation, the nano-crystalline anatase of the present invention has a higher adsorptive capacity than the amorphous titanium oxides. Moreover, the favorable adsorption kinetics of the titanium oxide products of the present invention are observed in the absence of acidic anions, such as chloride or sulfide, in contrast to expectations based on the disclosure of the Japanese Patent Application Publication 58-045705.

There are various ways to produce the surface-activated titanium oxide of the current invention. For instance, the product may be produced from a slurry of uncalcined titanium dioxide produced by a sulfate process, instead of by a chloride process. Moreover, the surface-activated crystalline titanium oxide product may contain various amounts of nano-crystalline rutile. A surface-activated crystalline titanium oxide product may also be produced from hydrolysable titanium compounds other than those disclosed herein. The apparatus and methods of removing dissolved inorganic contaminants from water may be varied within the range of variations presently known in the art, e.g., by replacing the packed bed filter with a fibrous filter or by contacting solution with a fluidized bed, while using a nano-crystalline anatase or another surface-activated crystalline titanium oxide product therein. The products, apparatus and methods may also be applied to the removal of dissolved organic substances other than the organic-substituted arsenic compounds disclosed herein, including organic-substituted metallic compounds, such as tetra-ethyl lead, and oxygenated organic compounds, such as methyl-t-butyl ether (MTBE). The product of the present invention has superior lead adsorption, when compared to amorphous titanium silicate, which is used in several commercial filters The high adsorptive capacity, rapid adsorptive kinetics, and low pressure drop of agglomerated crystalline surface-activated titanium oxide make it particularly useful for a number of applications. For example, home water purification devices benefit from compactness, long life, and low pressure drop. Water purification devices in home appliances such as refrigerators, dishwaters, and washing machines must be small in size to fit in available space in these appliances while still having adequate adsorption capacity to provide long life. Other home appliances such as faucet-mounted water purification devices and pour-through pitchers benefit from long lifetime, compact size, and low pressure drop.

After adsorption of heavy metals such as arsenic, the surface active crystalline titanium oxide product of the present invention may be disposed of using solid waste handling techniques known in the art. When tested with standard oxidative and reductive methods for leaching, the used product does not exceed standards for release of the arsenic for land disposal of wastes. Current standard tests for contaminant leachability include: The Toxic Characteristic Leaching Procedure (USEPA Method 1311, Test Methods for Evaluating Solid Waste, Physical/Chemical Methods, EPA Publication SW-846) and the Waste Extraction Test (California Code of Regulations, Title 22, Division 4.5, Chapter 11, Article 5, Appendix 11).

As an alternative to land disposal, the adsorbent of the present invention may be regenerated using processes already known in the art (e.g., regeneration using an alkaline solution). In an optimized system, one column volume of regenerant could regenerate a packed bed. However, it often will be preferable to dispose of used adsorptive media (e.g., in a landfill), because of complexities associated with the regeneration process, issues related to disposal of contaminant-containing streams resulting from the regeneration process, and process economies.

The surface activated crystalline titanium oxide of the present invention is capable of removing contaminants from streams that are substantially organic in composition. Disposal of waste ethylene glycol coolant that may contain arsenic at concentrations of hundreds of parts-per-million (ppm) or milligrams-per-liter (mg/L) has been problematic because of state and federal hazardous waste regulations. Removal of arsenic species by adsorption onto a solid support before disposal is an attractive solution to this problem and offers a potential new market for adsorption media. Agglomerated titanium oxide media is capable of removing arsenic from streams containing 50% or more ethylene glycol. In the examples below, surface-activated titanium oxide media was used to treat an ethylene glycol solution to decrease the arsenic concentration from 250 ppm to less than 10 ppm.

The following Examples are intended to aid in the understanding of the methods and products of the present invention and are not intended to limit the scope or spirit of the invention in any way.

EXAMPLE 1

Preparation and Characterization of a Surface-Activated Titanium Oxide Product

A powdered surface-activated titanium oxide product was prepared from a titanium oxide intermediate obtained from a commercial sulfate process used primarily to produce titanium dioxide pigments. The titanium oxide intermediate was collected as an acidic slurry after a separation and washing stage, but before a calcination stage. The pH of the slurry was adjusted to a pH between 4 and 9 with sodium hydroxide, and the slurry was filtered to collect the titanium oxide solids. The titanium oxide solids were washed with water to remove salts, and then dried at a selected temperature between about 105° C. and about 300° C. for about 2 hours. Samples of the dried titanium oxide product were powdered and sieved to obtain a 100-standard U.S. mesh fraction (i.e., a fraction having a mean particle diameter of about 150 μm).

Step-scanned X-ray powder diffraction data for the powdered samples were collected using an X-ray diffractometer (trademark: Rigaku DXR-3000, Rigaku/MSC Corporation, The Woodlands, Tex.) using Bragg-Brentano geometry, an iron (Fe) anode operating at 40 kV and 30 mA, and a diffracted beam graphite-monochromator. Measurements were taken using a 1° divergence slit and a 0.15 mm receiving slit. FeKα radiation from the Fe anode, i.e., radiation having a wavelength of 1.9373 Å, was used as the X-ray source. Data were collected between 15°-65° of 2Θ (where 2Θ represents two times the angle of Bragg diffraction) with a step size of 0.05° and a count time of 5 seconds per step. Measurements made on silicon powder (NBS 640, a=5.43088) were used to correct the 2Θ values.

The X-ray diffraction patterns obtained for the powdered samples included the characteristic peaks of the X-ray diffraction pattern of crystalline titanium dioxide for the FeKα wavelength used. The characteristic diffraction pattern of crystalline titanium dioxide is a combination of peaks having maxima at 25.29°±0.3°, 38.00°±0.3°, 47.90°±0.3°, 55.77°±0.3° and 62.71°±0.3° of 2Θ, with the most intense peak having its maximum at 25.29°±0.3° of 2Θ.

Crystalline interplanar distances (d) were calculated using Bragg's law:

$$2 d \sin \Theta = n \lambda$$

where $\Theta$ is the angle of diffraction; n is an integer value; and $\lambda$ is the wavelength of the X-ray source, in this case, $\lambda$=1.9373 Å. Anatase crystals have interplanar distances (d) between 3.45 and 3.60 Å, in contrast, e.g., to rutile crystals which have interplanar distances (d) between 3.20 and 3.30 Å. The calculated interplanar distances (d) for the powdered samples of the titanium oxide product were determined to be within the characteristic range for anatase.

Primary crystallite diameters ($d_0$) were calculated by the Scherrer equation:

$$d_0 = K \lambda / \beta \cos \Theta,$$

where K is a statistically determined pre-factor, in this case, K=0.89; $\lambda$ is the wavelength of the X-ray source, in this case, $\lambda$=1.9373 Å; $\beta$ is the pure full width, expressed in radians, of the peak at 2Θ=25.29° at half of its maximum intensity, in this case, $\beta$=((1.215°-0.15°)×π)/180°=0.0186 radians, where 1.215° is the observed peak broadening, 0.15° is the strain and instrumental peak broadening, and π=3.14; and $\Theta$ is the Bragg angle of diffraction. The calculated primary crystallite diameters for the titanium oxide product obtained by the Scherrer equation were in the range of about 6.6 nm to about 10.89 nm for samples dried at temperatures between about 105° C. and about 700° C.

The X-ray diffraction spectrograph and the calculated interplanar distances (d) and Scherrer primary crystallite diameters ($d_0$) demonstrate that the granular surface-activated titanium dioxide product formed by the method described above is primarily, if not entirely, comprised of nano-crystalline anatase.

EXAMPLE 2

Porosity and Surface Characteristics of Nano-Crystalline Anatase

A sample of powdered nano-crystalline anatase was prepared according to the method of Example 1 and dried at a temperature of 105° C. The BET specific surface area and the porosity of the sample were determined by a static volumetric gas adsorption technique. Measurements were taken using a gas-absorption/desorption analyzer (trademark: ASAP 2010, Micromeritics, Norcross, Ga.). A sample tube containing the sample of nano-crystalline anatase was cooled in liquid nitrogen and evacuated to degas the sample. Measured amounts of nitrogen gas were then introduced and the amount of nitrogen adsorbed by the nano-crystalline anatase was determined at a series of defined pressures. The resulting data, i.e., curves of the volume of nitrogen adsorbed vs. the relative nitrogen pressure, were reduced using the BET equation to determine the BET specific surface area of the sample and using the BJH method to determine pore size distribution. The sample of nano-crystalline anatase was determined to have a BET specific surface area of about 330 $m^2$/gm and a total pore volume of 0.42 $cm^3$/gm for pores with diameters less than 0.63 μm.

The available surface hydroxyl content, i.e., the number of hydroxyl groups available for chemical reaction, was measured for two samples of nano-crystalline anatase that had been dried at different temperatures. The samples were prepared according to the method of Example 1. One sample was dried at a temperature of 105° C. and the other sample was dried at a temperature of 350° C. The available hydroxyl content was determined by suspending 10 gm of the sample into 200 mL of a 0.01 molar sodium chloride solution, using a continuous nitrogen purge. The pH of the suspension was adjusted to 5.5 and maintained at that level for 1 hour by addition of sodium hydroxide and hydrochloric acid. The suspension was then titrated with 0.2 molar sodium hydroxide to a pH of 12 over a period of three hours. A blank solution of 0.01 molar sodium chloride was pH-adjusted and titrated by the same procedure. The available surface hydroxyl content was calculated from the amount of excess sodium hydroxide consumed in titration of the suspension, relative to the amount consumed in titration of the blank. The available surface hydroxyl content of the sample dried at 105° C. was determined to be about 1.1 mmol/gm of nano-crystalline anatase. The available hydroxyl content of the sample dried at 350° C. was determined to be about 0.4 mmol/gm of nano-crystalline anatase.

EXAMPLE 3

Batch Adsorption of Dissolved Metals from Aqueous Solutions

A powdered nano-crystalline anatase product was prepared according to the method of Example 1 using a drying temperature of 105° C. Aqueous samples of dissolved metals, or of the species containing arsenate (As (V)) and arsenite (As (III)), were prepared for testing by dissolving salts of the selected substances in tap water to the initial concentrations shown in Table 1, and adjusting the samples to a neutral pH. Batch experiments were conducted by adding the nano-crystalline anatase product to each aqueous sample, to obtain the titanium oxide content shown in Table I, and suspending the nano-crystalline anatase product in the aqueous sample by mixing for about one hour. The results in Table I show that the nano-crystalline anatase product removes a large percentage of each metal from the respective aqueous solutions in a relatively short time, i.e., one hour or less. The high degree of arsenite (As (III)) removal is particularly noteworthy, since conventional adsorbents, such as alumina or ferric hydroxide, are known to have much lower capacities for removal arsenite. Similar degrees of removal were demonstrated in subsequent tests performed on samples of arsenate, arsenite and metal salts dissolved in deionized water. These tests demonstrated that presence of chloride, or other acidic anions, is unnecessary for achieving high rates of removal with the nano-crystalline anatase product of the present invention.

anatase product was packed in a 1-inch diameter column to a bed depth of 6 inches. Arsenate and lead were added to tap water to obtain initial concentrations of 100 µg/L of As (V) and 100 µg/L of Pb (II), respectively, in separate tap water samples. Each tap water sample was pumped through the packed column at an empty bed contact time (EBCT) of 36-90 seconds. Effluent concentrations of both As (V) and Pb (II) were less than 3 µg/L. The attainment of such low effluent concentrations at a short EBCT indicates that adsorption of these contaminants at low concentrations occurs at a very rapid rate using the nano-crystalline anatase product of the present invention.

EXAMPLE 5

Arsenic Removal from Natural Groundwater

A packed column of nano-crystalline anatase product was prepared as described in Example 4. Natural groundwater containing about 25 to 40 µg/L arsenic was pumped through the column at an EBCT of about 100 seconds. As shown in FIG. 1, arsenic concentrations in the treated effluent were less than 2 µg/L; with breakthrough occurring after more than 30,000 bed volumes of the contaminated groundwater had been treated.

EXAMPLE 6

Comparison of the Removal of Arsenate from Spiked Tap Water by Different Forms of Titanium Oxide Rutile having a primary crystallite diameter ($d_0$) of about 130 nm was obtained from a titanium oxide manufacturer. Nano-crystalline anatase having a primary crystallite diameter ($d_0$) of about 6.6 nm was prepared as described in Example 1, using a drying temperature of about 105° C. Two different amorphous titanium hydroxides were also prepared:

TABLE 1

Removal of Dissolved Contaminants by Powdered Nano-Crystalline Anatase

|  | As(V) | As(III) | Cd(II) | Pb(II) | U(VI) | Hg(II) | Cu(II) | Cr(VI) |
|---|---|---|---|---|---|---|---|---|
| Initial concentration (mg/L) | 50 | 50 | 1.0 | 1.0 | 8.0 | 0.5 | 0.5 | 0.1 |
| Final concentration (mg/L) | 9.1 | 13.0 | 0.024 | 0.018 | 0.08 | 0.026 | 0.005 | 0.003 |
| Percent removal (%) | 81.8 | 74.0 | 97.6 | 98.2 | 99.0 | 95.5 | 98.8 | 97.0 |
| Titanium oxide content (g/L) | 1.0 | 1.0 | 1.0 | 1.0 | 1.0 | 1.0 | 1.0 | 0.5 |

EXAMPLE 4

Column Filtration of Dissolved Contaminants from Aqueous Solution

Figure 2:
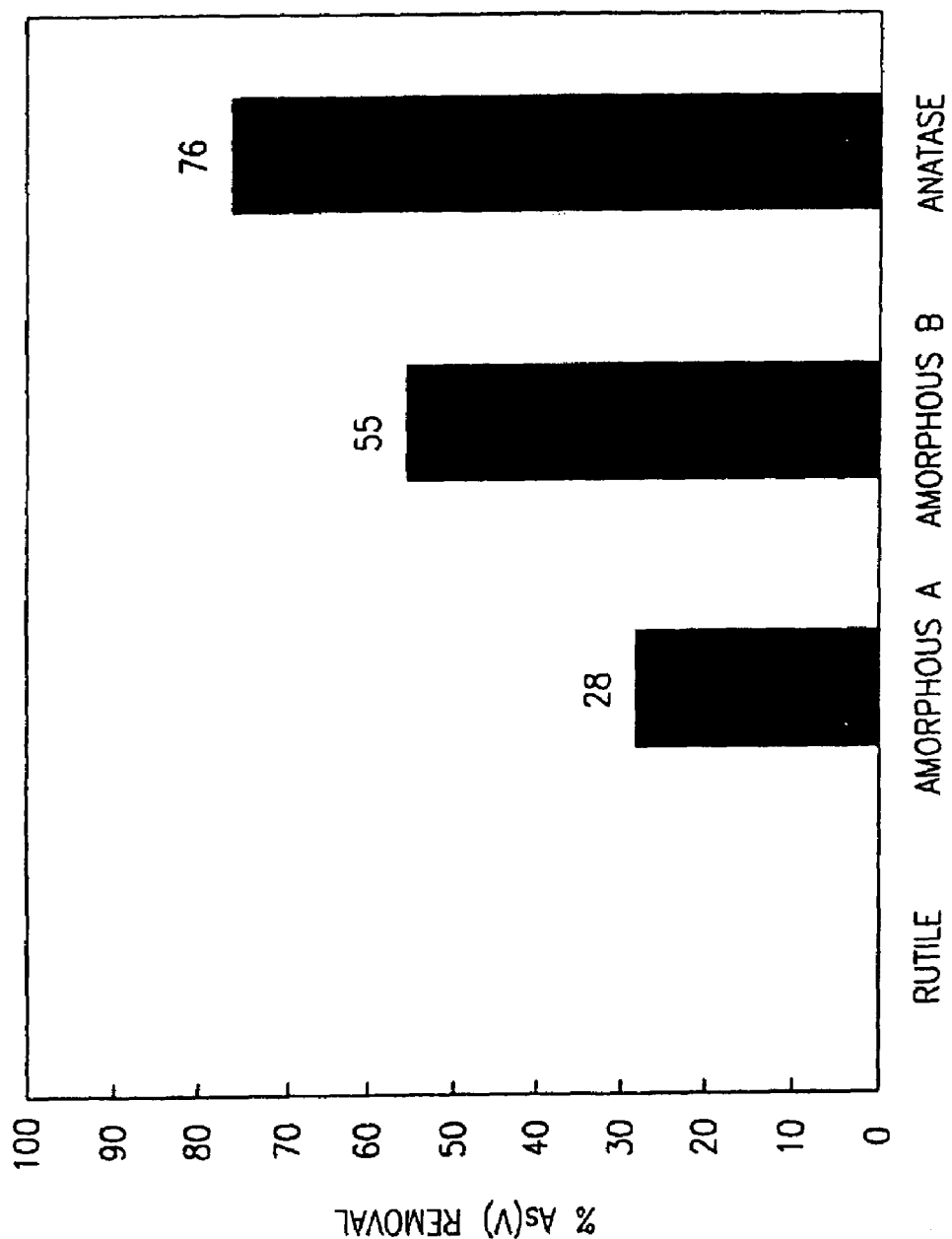
FIG. 2 is a bar chart of the efficiency of different forms of titanium oxide, including a nano-crystalline anatase prepared according to the present invention, in removing dissolved arsenate from water.

Samples of nano-crystalline anatase product were prepared according to the method described in Example 1 using a drying temperature of 105° C., and sieved to obtain a 20-50 standard U.S. mesh fraction (i.e., particles having an average diameter of about 0.30 to 0.85 mm). The nano-crystalline one ("amorphous A") by rapidly neutralizing a solution of acidic titanyl sulfate; and the other ("amorphous B") by slowly adding water to a solution of titanium (IV) isopropoxide in isopropanol to hydrolyze the titanium isopropoxide. Arsenate (As (V)) was added to samples of tap water to an initial concentration of about 50 mg/L. About 0.1 gm of each sample of titanium oxide was added to 100 mL of the tap water sample at a neutral pH and suspended therein by mixing for about 1 hour. As shown in FIG. 2, the rutile sample was ineffective in removing dissolved arsenate from the tap water sample. The amorphous A and amorphous B samples removed 28% and 55% of the dissolved arsenate, respectively. The nano-crystalline anatase sample showed the greatest removal of dissolved arsenate at about 76% removal.

EXAMPLE 7

Effect of Anatase Crystal Size on Removal of Arsenate from Water

Figure 3:
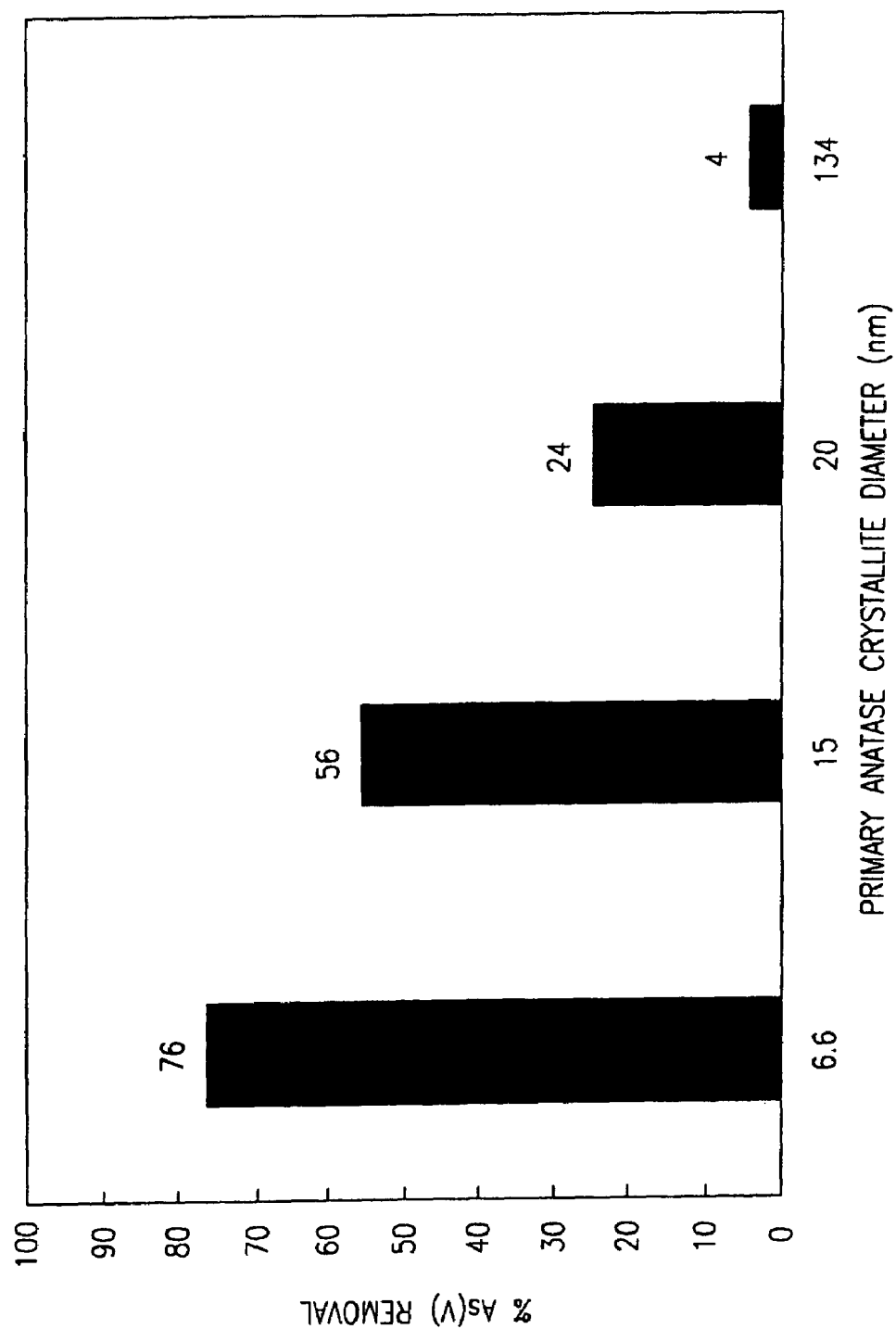
FIG. 3 is a bar chart comparing the efficiency of anatase having different primary crystallite diameters in removing dissolved arsenate from water.

A number of batch adsorption tests were performed in which samples of powdered nano-crystalline anatase product having different primary crystallite diameters ($d_0$) were used to remove arsenate from tap water samples. The data from these tests were analyzed to correlate the degree of arsenate removal with the primary crystallite diameter ($d_0$) of the anatase sample. As shown in FIG. 3, the degree of removal was highest for samples of anatase having the smallest primary crystallite diameters ($d_0$=6.6 nm) and lowest for samples of anatase having the largest primary crystallite diameters ($d_0$=134 nm).

EXAMPLE 8

Effect of Drying Temperature on Anatase Crystal Size and Adsorption Capacity

Figure 4:
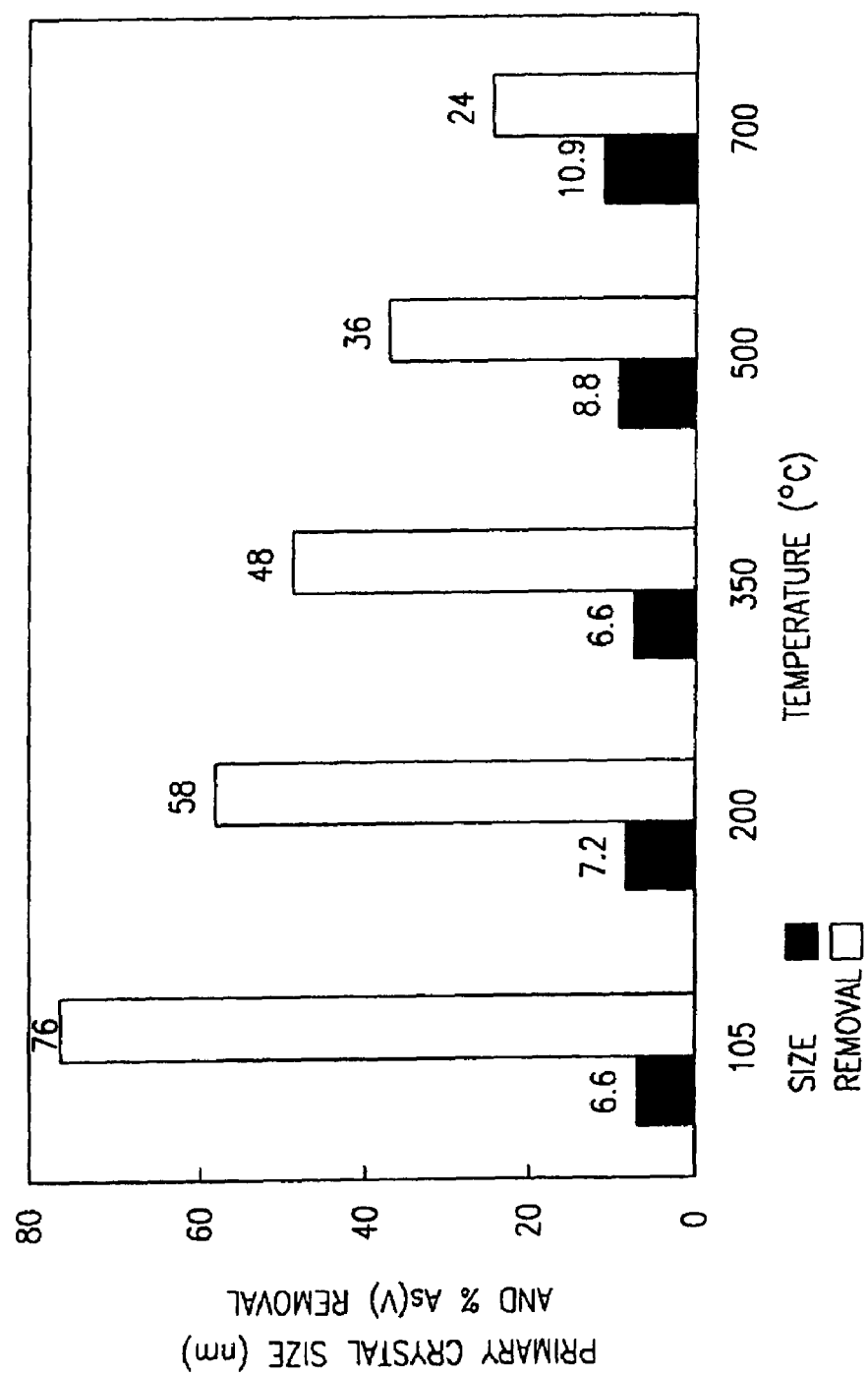
FIG. 4 is a bar chart comparing the crystallite diameters of samples of anatase and the efficiency of the anatase samples in removing arsenate from water to the temperature at which the anatase is dried during its production according to a method of the present invention.

A number of samples of powdered nano-crystalline anatase product were prepared at different drying temperatures according to the method described in Example 1 and tested for their effectiveness in removing arsenate from tap water samples. FIG. 4 illustrates the relationship of the drying temperature to the primary crystallite diameter of the anatase crystals in the surface-activated titanium oxide samples and to the degree of arsenate removal demonstrated in the batch adsorption tests. Drying the anatase product at temperatures up to 700° C. or greater increased the primary crystallite diameter ($d_0$) from about 6.6 nm at the lower temperatures to about 10.9 nm at the highest temperature. The removal efficiency of the titanium oxide product toward arsenate decreased from 76% to 24% over the same temperature range. Between drying temperatures of 105° C. and about 350° C., the removal efficiency dropped substantially without a commensurate increase in primary crystallite diameter ($d_0$).

EXAMPLE 9

Adsorption Capacity of a Nano-crystalline Anatase Product

Figure 5:
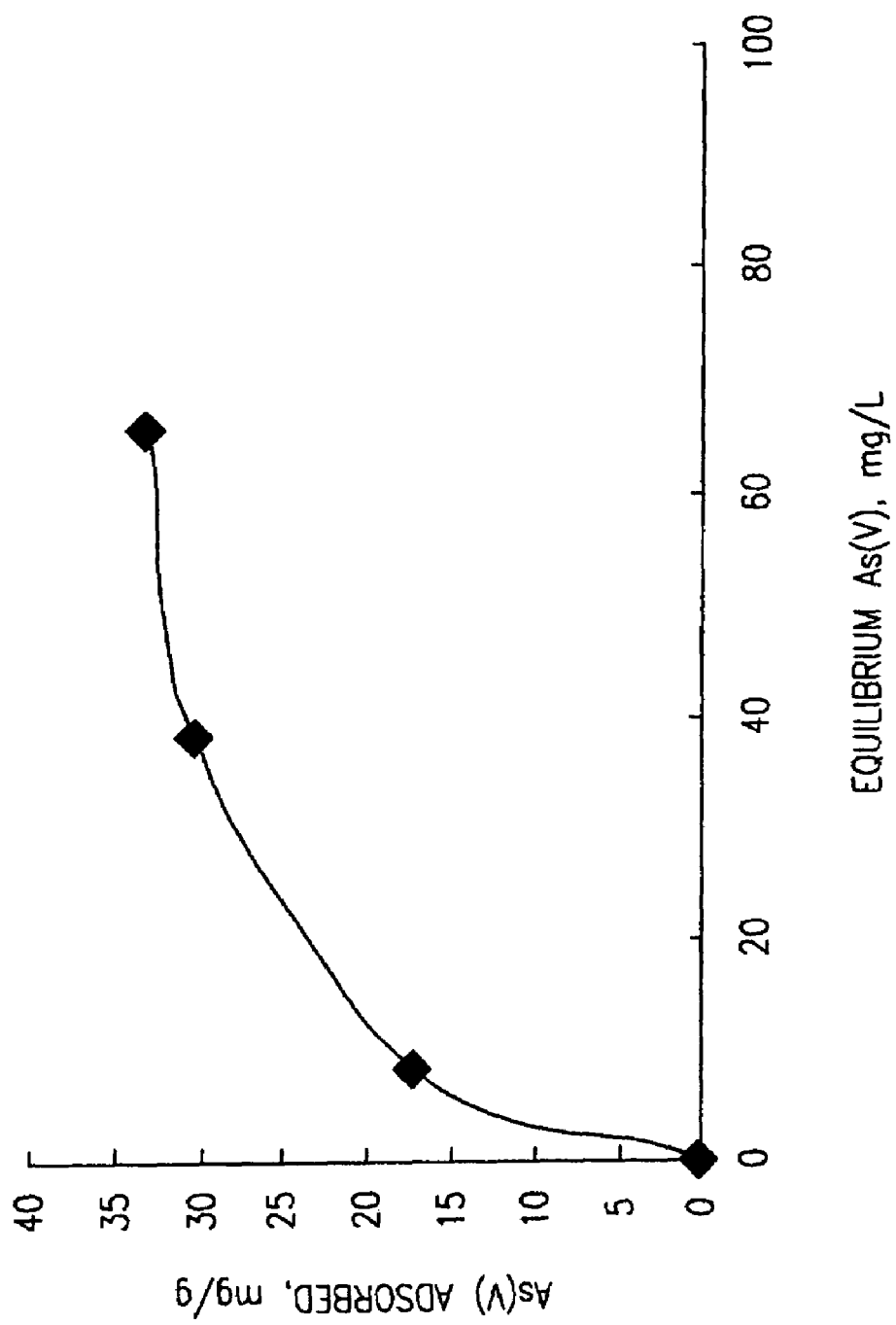
FIG. 5 is a graph of an adsorption isotherm of arsenate (As (V)) adsorption from water by nano-crystalline anatase prepared according to the present invention.

An adsorption isotherm FIG. 5 was prepared to assess the adsorption capacity of a surface-activated crystalline titanium oxide product prepared according to the method described in Example 1, using a drying temperature of 105° C. The tests were performed on a sieve fraction of the titanium oxide product in the size range of 16-30 mesh (i.e., having mean diameters between 0.60 and 1.18 mm). Arsenate (As (V)) solutions were prepared in tap water at a pH of about 7 at initial concentrations of 0-100 mg As (V)/L. The resulting isotherm indicates that the adsorption capacity of the surface-activated crystalline titanium oxide product is approximately 34 mg As (V)/gm of titanium oxide at that concentration.

EXAMPLE 10

Dynamic Capacity and Pressure Drop in a Packed Column Using Agglomerated Surface Active Crystalline Titanium Oxide Product Agglomerated surface active crystalline titanium oxide product was prepared by mixing the titanium oxide product with 24 (w/w) % of a 30% (w/w) solution of ammonium-stabilized colloidal silicate solution. When the mixture was dried, the agglomerated product was 5% silicate by weight. The agglomerate was screened to include 20 to 30 U.S. mesh sieve sizes (595 micron to 841 micron).

A 0.45 inch diameter column was filled to a 4 inch bed depth with referenced test media. Two additional columns having the same dimensions as the first were filled to a 4-inch bed depth with a granular ferric oxide (trademark: AdEdge AD-33, AdEdge Technologies, Inc., Buford, Georgia, U.S.A.) and granular ferric hydroxide (GFH), (Wasserchemie GmbH & Co. KG, Osnabrück, Germany) respectively. A solution of water was prepared as per ANSI standard 53 ("NSF 53 challenge water") meeting the specification at pH 8.5, as shown in Table 2:

TABLE 2

| Composition of NSF 53 challenge water | |
|---|---|
| Parameter | mg/kg, Spec |
| SiO2 | 20 |
| Mg | 12 |
| SO4 | 50 |
| N | 2.0 |
| F | 1.0 |
| P | 0.04 |
| Ca | 40 |
| Total Chloride | 0.5 |
| As | 0.05 |

The prepared solution was passed through the columns at 5 gallons per minute per square foot (gpm/ft$^2$) of media surface area in the columns, equating to an EBCT of 30 seconds.

The pressure differential developed by the flowing water through the bed, and the arsenic content of the effluent water from each bed of media were recorded. The arsenic content of the effluent water from the agglomerated surface activated titanium dioxide did not exceed 10 ppb until after approximately 8,000 bed volumes of feed water has passed through the column (at about 10.4 ml per bed volume), whereas the column containing the AdEdge E-33 had an effluent water composition containing greater than 10 ppb arsenic at about 1,500 bed volumes of feed water, and the GFH had an effluent water composition containing greater than 10 ppb arsenic at about 3,000 bed volumes of water. The pressure differential created by the flow of feed water through the column containing the agglomerated surface activated titanium dioxide did not exceed approximately 1 psi. A similar column containing agglomerated surface-activated titanium dioxide and operated at a flow rate of 20 gpm/ft$^2$ of media surface area exhibited a pressure drop of drop of 2.25 psi in the column. The pressure differential created by the flow of feed water through the column containing AdEdge E-33 exceeded 60 psi after approximately 70 hours of operation. The pressure differential created by the flow of feed water through the column containing the GFH exceeded 3 psi after approximately 10 hours of operation. The agglomerated surface activated titanium dioxide therefore removed arsenic more effectively and resulted in a lower pressure drop than either of the other two materials tested.

EXAMPLE 11

Adsorption Isotherms for Surface-Activated Crystalline Titanium Oxide-Agglomerate and Granular Ferric Hydroxide Media The performance of surface-activated titanium oxide granulate prepared as in Example 10 and granular ferric hydroxide (GFH) (Wasserchemie GmbH & Co. KG, Osnabruck, Germany) were compared by adsorption isotherms in NSF 53 Challenge Water at pH 6.5 and 8.5. As seen in Table 3, The removal of As(V) was greater for the surface-activated titanium oxide-granulate than for the GFH.

TABLE 3

Adsorptive Capacities of Surface-Activated Titanium Oxide Granulate and Granular Ferric Hydroxide

| Media | pH | Q (grams As(V) adsorbed per Kg media) |
|---|---|---|
| GFH | 6.5 | 4 |
| Surface activated titanium oxide granulation | 6.5 | 12 |
| GFH | 8.5 | 5 |
| Surface activated titanium oxide granulation | 8.5 | 7 |

EXAMPLE 12

Adsorption Isotherms for Agglomerated Surface-Activated Crystalline Titanium Oxide Product in NSF53 Challenge Water Containing Phosphate The adsorption performance of agglomerated surface-activated crystalline titanium oxide product, prepared as in Example 11, was tested in NSF 53 Challenge Water, to which sodium phosphate was added, at pH 6.5. Initial concentrations of phosphate in the range of 0.12-12.3 ppm had no effect on the capacity of surface-activated crystalline titanium oxide product. At 10 ppb As (V) and 100 ppb As (V), the capacity of agglomerated surface-activated crystalline titanium oxide product was 4.6 g As (V)/Kg media and 9.2 g As (V)/Kg media, respectively.

EXAMPLE 13

Comparison of the Batch Adsorption of Arsenate from Aqueous Solution by Nano-Crystalline Anatase and Granular Ferric Hydroxide Batch adsorption tests were performed to compare the effectiveness of a powdered nano-crystalline anatase product, prepared according to the method of Example 1 using a drying temperature of 105° C., and GFH, (Wasserchemie GmbH & Co. KG, Osnabrück, Germany) in removing (As(V) from water. The As (V) samples were prepared at a neutral pH in tap water to an initial concentration of 50 mg As (V)/L. The nano-crystalline anatase and ferric hydroxide were added to their respective water samples to concentrations of 1.0 gm/L and suspended in the water samples by mixing for about one hour. The results in Table 4 show that the nano-crystalline anatase sample removed substantially more of the dissolved arsenate (81.8%) than did the ferric hydroxide sample (34.0%).

TABLE 4

Comparison of As (V) Removal by Nano-Crystalline Anatase and Ferric Hydroxide

| | Nano-crystalline anatase (1.0 g/L) | Ferric hydroxide (1.0 g/L) |
|---|---|---|
| Initial concentration (mg/L) | 50 | 50 |
| Final concentration. (mg/L) | 9.1 | 33 |
| Percent removal, % | 81.8 | 34.0 |

EXAMPLE 14

Lead Removal by Filtration through a Porous Adsorbent Block

Porous adsorbent blocks were prepared by mixing 30% (w/w) surface-activated titanium oxide, 40% (w/w) powdered activated carbon, and 30% (w/w) polymer binder, then extruding the mixture through a die. Aqueous streams containing dissolved lead (Pb(II)) were filtered through the blocks on 20-minute cycles (i.e., 10 minutes on, 10 minutes off) for 16 hours each day, with an 8-hour stagnation period overnight. Tests were conducted using an influent Pb(II) concentration of about 150 μg/L at a pH of 8.5. As can be seen in Table 5, the porous adsorbent blocks reduced the concentrations of dissolved lead by over 98%.

TABLE 5

Removal of Lead by a Porous Adsorbent Block

| Effluent Treated (gal) | Influent Pb(II) Conc. (μg/L) | Effluent Pb(II) Conc. (μg/L) |
|---|---|---|
| 0 | 140 | 1 |
| 250 | 160 | ND |
| 750 | 140 | 3 |
| 1000 | 140 | ND |

ND—Not detectable by analytical method used (USEPA Method 200.8)

EXAMPLE 15

Toxic Characteristic Leaching Protocol (TCLP) Test Results and California Waste Extraction Test The Toxic Characteristic Leaching Procedure (TCLP) (USEPA Method 1311, Test Methods for Evaluating Solid Waste, Physical/Chemical Methods, EPA Publication SW-846) and the Waste Extraction Test (California Code of Regulations, Title 22, Division 4.5, Chapter 11, Article 5, Appendix 11) were used to evaluate the leaching of arsenic from agglomerated surface-active titanium oxide product, prepared as in Example 10, by subjecting product samples having arsenic adsorbed thereto to simulated leaching conditions in the laboratory.

The measured concentrations of arsenic in each of three simulated leachates were found to be below the regulatory levels of the respective tests. Thus, the product samples would not be barred from land disposal on the basis of the regulatory limits for leachate.

Product samples were prepared for testing by equilibrating agglomerated surface-active titanium oxide product with an As (V) solution for 72 hours to simulate a "worst case" breakthrough condition under dynamic performance. To 28 grams of product sample were added 356 grams of deionized water and 50 mg of As (V) to give an initial solution concentration of 140 ppm As. The slurry was adjusted to pH=6.8 using NaOH and then equilibrated by shaking for 72 hours. After equilibration, the concentration of As in a small amount of filtered solution was tested by ICP and found to contain 100±20 ppb As (V). The slurry was and air-dried overnight. The arsenic loading on the composite $TiO_2$ solids was calculated to be 1,770 ppm As.

Toxic Characteristic Leaching Procedure (TCLP)

Extract Solution 1

Procedural details of the TCLP were followed. Twenty grams of composite test sample were extracted for 18 hours according to the TCLP using 400 grams of Extract Solution 1 (i.e., sodium acetate buffer at pH 4.9). Following extraction, the slurry was filtered. Arsenic in the filtrate was determined by inductively coupled plasma-optical emission spectroscopy (ICP-OES) using a two point calibration consisting of the blank extract solution and blank extract solution fortified at 1 ppm As.

Extract Solution 2

Twenty grams of composite test sample were also extracted for 18 hours according to the TCLP using 400 grams of Extract Solution 2 (i.e., sodium acetate buffer at pH 2.9). Following extraction, the slurry was filtered. Arsenic in the filtrate was determined by inductively coupled plasma-optical emission spectroscopy (ICP-OES) using a two point calibration consisting of the blank extract solution and blank extract solution fortified at 1 ppm As.

Waste Extraction Test (WET)

Procedural details of the Waste Extraction Test were followed Twenty grams of composite test sample were extracted for 48 hours at ambient temperature according to WET using 200 mL of deoxygenated citrate buffer at pH 5.0. Following extraction, the slurry was filtered through Whatman filter paper #42 and 0.45 micron membrane filter. Because of the small particle size of the $TiO_2$ media, the slurry was also filtered through 0.1 micron filter media. Arsenic in the filtrate was determined by graphite furnace atomic absorption.

Results for the TCLP and WET studies are reported in Table 6. The measured level for arsenic in each extract was below the regulatory level of the respective test. Thus, no significant amount of arsenic was leached from the agglomerated surface-active crystalline titanium oxide product sample under simulated leaching conditions.

TABLE 6

Leachable arsenic from agglomerated surface-active crystalline titanium oxide product sample using TCLP and WET Tests.

| | TCLP Regulatory Limit (1) (mg/L) | WET Soluble Threshold Limit Concentration(2) (mg/L) | TCLP Extract #1 (mg/L) | TCLP Extract #2 (mg/L) | WET Extract (mg/L) |
|---|---|---|---|---|---|
| Arsenic | 5 | 5 | 0.1 | 0.1 | 1 |

EXAMPLE 16

Removal of Arsenic from Ethylene Glycol

To determine the actual adsorbent capacity in waste ethylene glycol engine coolant, less than 1 g of agglomerated surface activated crystalline titanium oxide, prepared as in Example 10 was mixed with 40-50 g of waste ethylene glycol. The pH of test mixtures was adjusted between pH 4-9 using $HNO_3$ or NaOH. The mixture was allowed to reach equilibrium by gentle mixing on a rotary wheel for at least 12 hours. Upon reaching equilibrium, the filtrate was diluted 10-fold with deionized water. Arsenic was determined by inductively coupled plasma emission spectrometry using a Perkin-Elmer 4300DV instrument at 188.979 nm and 228.812 nm.

Phosphate and borate frequently are present in ethylene glycol solutions. Isotherm experiments were performed to determine the effect of phosphate and borate on arsenic adsorption. Stock solutions of 40 mg/mL phosphate and 10 mg/mL borate solution in deionized water were prepared from sodium dibasic phosphate and sodium borate, respectively. Pure ethylene glycol was mixed with deionized water and phosphate or borate solution to make a 50 wt. % concentration. Adequate amounts of As (III) and As (V) from 4,000 mg/L stock solution, typically 200-300 mg/L in 50 wt. % glycol solution, were added and pH was adjusted to 7. The mixture was then shaken on a bed shaker for at least 4 hours. Upon reaching equilibrium, an aliquot of the mixture was filtered and the filtrate was diluted 10-fold with deionized water. Arsenic in the filtrate was determined.

Figure 6:
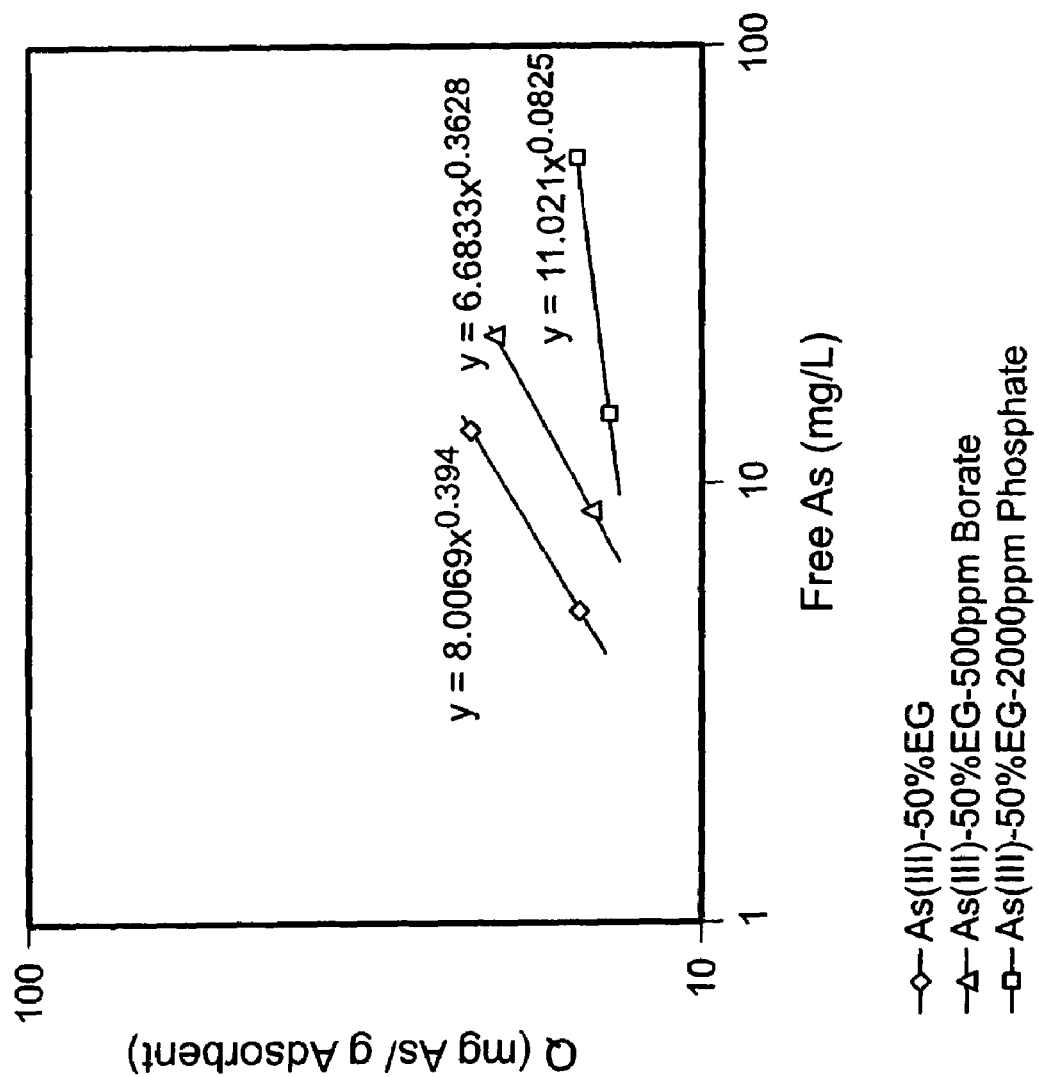
FIG. 6 is a graph showing the effect of borate and phosphate on the arsenite adsorption capacity of granulated titanium oxide in an organic solution containing 50% ethylene glycol.
Figure 7:
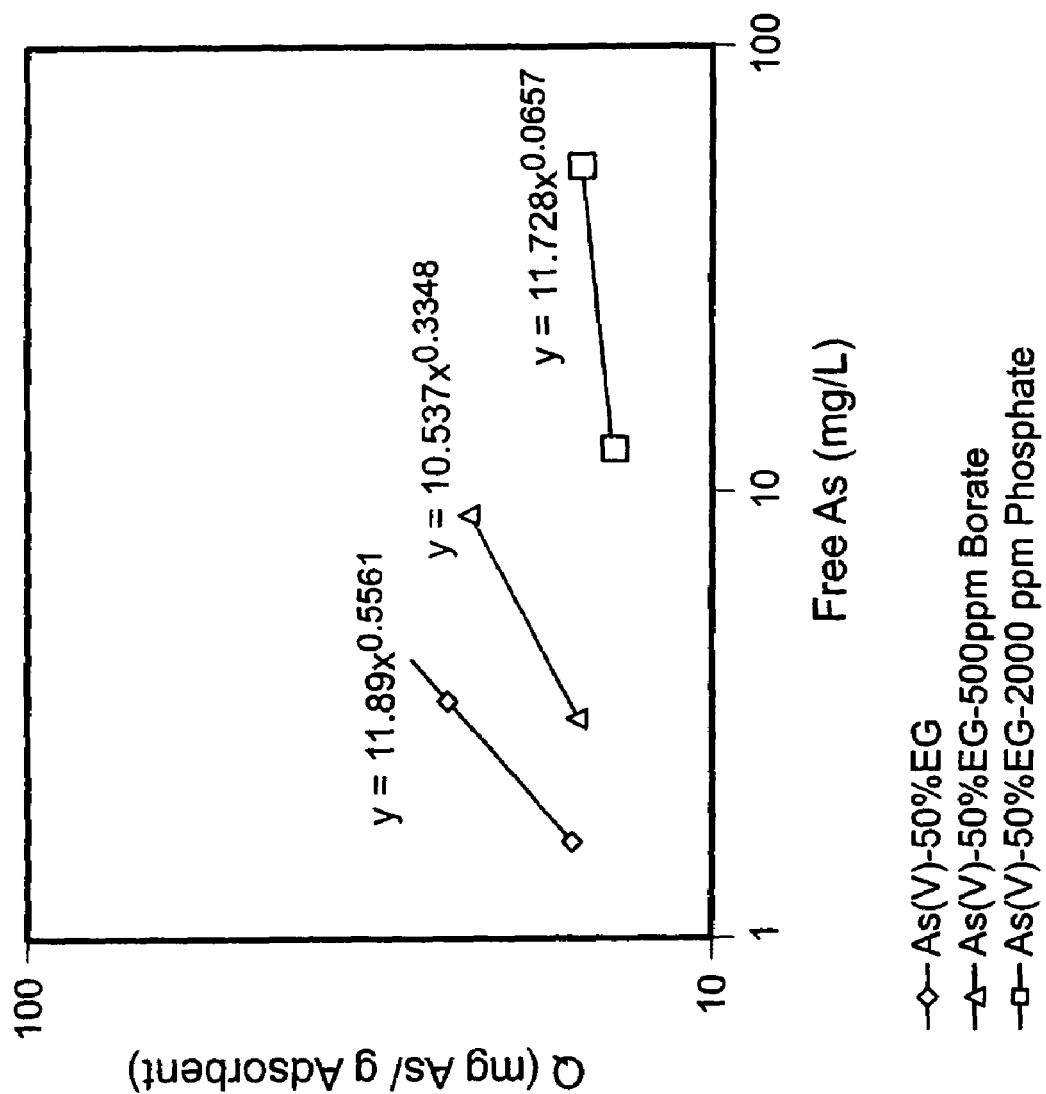
FIG. 7 is a graph showing the effect of borate and phosphate on the arsenate adsorption capacity of granulated titanium oxide in an organic solution containing 50% ethylene glycol.

Equilibrium adsorption isotherms were determined for As (III) and As (V) in an organic solution containing 50% (w/w) ethylene glycol and glycol containing phosphate and borate. The isotherms are shown in FIGS. 6 and 7.

As a second alternative, sample acidification was studied. Assuming basic phosphates compete with arsenite or arsenate for an adsorption site, the interference of phosphate can be minimized by changing the media pH. It is likely that phosphates of higher basicity (e.g., $PO_4^{3-}$, which has a higher basicity than $HPO_4^{2-}$) will adsorb more strongly on the adsorbent site. Reducing the pH will reduce the concentration of basic phosphate and hence may increase the adsorption of arsenic. However, at lower pH, the adsorption of arsenic may also decrease as proton competition for the site becomes more important.

Figure 8:
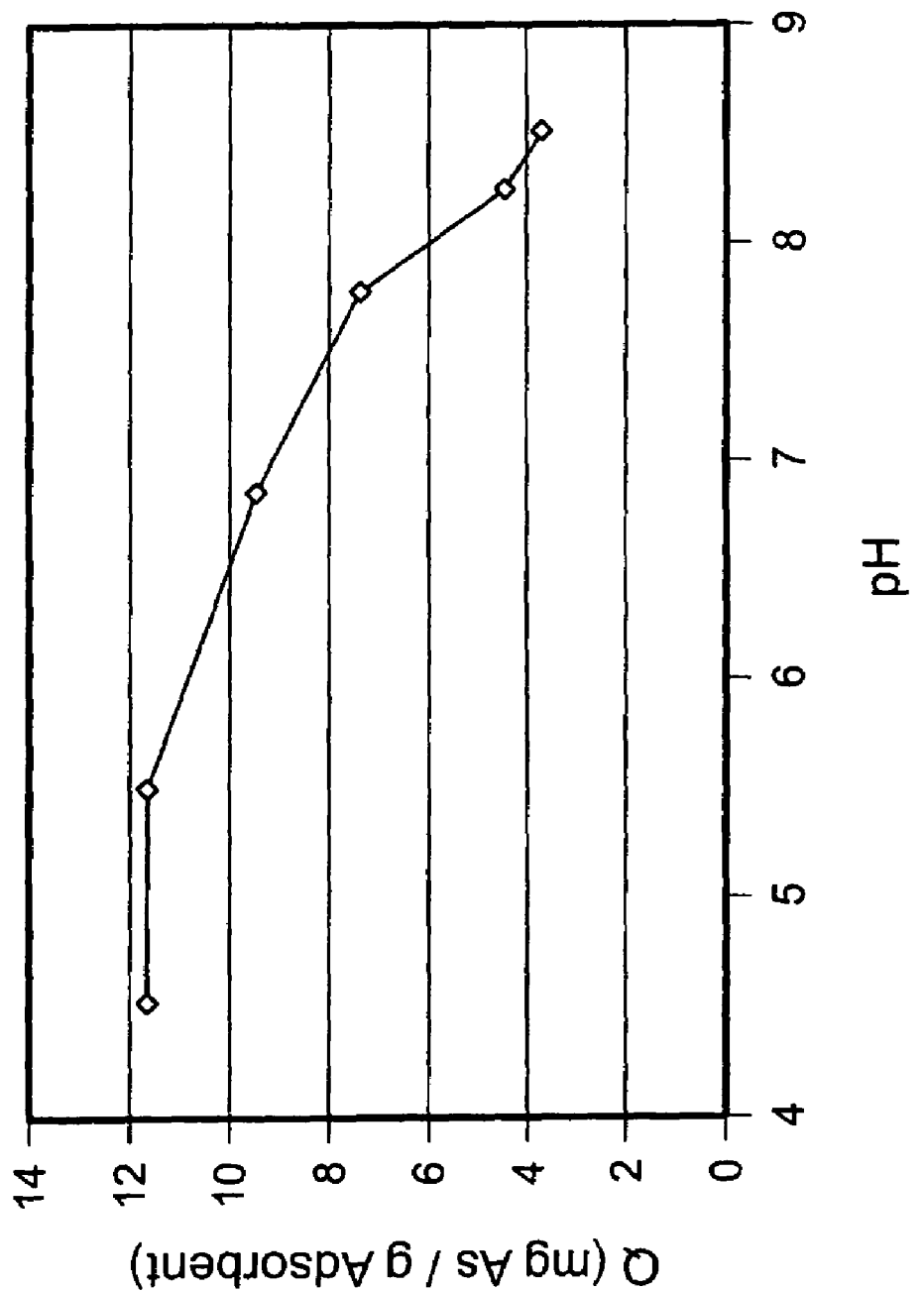
FIG. 8 is a graph showing the effect of pH on the capacity of arsenic adsorption by granulated surface treated titanium oxide product in a waste ethylene glycol engine coolant.

The optimum pH range was determined from a pH-adsorption capacity study summarized in FIG. 8. In these experiments, a slow rotor mixer was used instead of a bed shaker to avoid attrition of the adsorbent media. An optimum capacity of 12 mg As/g adsorbent was obtained in the 50% (w/w) waste glycol engine coolant at pH 5.

EXAMPLE 17

Preparation of an Adsorbent Granulate from Latex

The surface-activated titanium oxide in the form of nanocrystalline anatase was blended with a sodium latex (trademark: USCAR CP 620, Union Carbide Corporation, South Charleston, W. Va.). The blended material was allowed to air dry. The final agglomerate contained 20% latex solids. The agglomerate was screened to 20 to 40 U.S. Mesh (420 micron to 841 micron). Using the method of Example 10, water was passed through the agglomerate. At 5,000 bed volumes, the resulting effluent had an arsenic concentration of less than 10 µg/L.

EXAMPLE 18

Removal of Selenium from Aqueous Solution

The adsorption performance of agglomerated surface-activated crystalline titanium oxide product, prepared as in Example 10 was tested in NSF 53 Challenge Water at pH 7, to which selenium was added. The adsorption capacity at 10 ppb and 100 ppb Se (IV) was 2.1 and 5.0 g Se (IV)/Kg media, respectively.

It should be understood that the embodiments described herein are merely exemplary and that a person skilled in the art may make many variations and modifications thereto without departing from the spirit and scope of the present invention. All such variations and modifications, including those discussed above, are intended to be included within the scope of the invention as defined in the appended claims.

We claim:

1. A method for removing dissolved contaminants from a solution, comprising the step of contacting a surface-activated titanium oxide in the form of nano-crystalline anatase with a solution containing dissolved contaminants without irradiating the surface-activated titanium oxide.

2. The method of claim 1 wherein the surface-activated titanium oxide is packed in a column. said method further comprising the step of passing the solution through the surrace-activated crystalline titanium oxide at a rate of less than about 20 gallons per minute per square foot and a pressure drop of less than about 10 pounds per square inch square foot of column length during said contacting step.

3. The method of claim 1 wherein the surfare-activated titanium oxide, when packed in a column havinq a diameter of about 0.45 inches and a depth of about 4 inches, exhibits a pressure drop of less than about 1 psi when water is passed through the column at a flow rate of about 0.006 gpm.

4. The method of claim 1 wherein the solution comprises water originating from a groundwater source.

5. The method of claim 1 wherein the solution comprises effluent from a water-treatment unit.

6. the method of claim 1 wherein said solution is a wastewater stream from an industrial process.

7. The method of claim 1 further comprising the step of washing at least some of the surface-activated titanium oxide before said contacting step.

8. A method for removing dissolved contaminants from a solution, the dissolved contaminants including one or more of aluminum. antimony, arsenic in the form of one or both of arsenic(III) and arsenic(V), barium, cadmium, cesium. chromium, cobalt, copper. gallium, goid, iron, lead. manganese. molybdenum, nickel, platinum, radium, selenium, silver. strontium, tellurium, tin tungsten, uranium, vanadium, zinc, nitrite, phosphate. sulfite. sulfide. and a low-molecular weight organic arsenic compound, the method comprising the step of contacting a surface-activated titanium oxide in the form of nano-crystalline anatase with the solution without irradiating the surface-activated titanium oxide, whereby the concentration of at least one of the dissolved contaminants in the solution is reduced.

9. The method of claim 8 wherein the dissolved contaminants include arsenic in the form of one or both of arsenic (III) and arsenic (V) said contacting step further comprsing the step of removing at least 80 percent of the arsenic from the soluuon.

10. The method of claim 9 where the portion of the arsenic removed by said removing step comprises arsenic (III) and the solution iS an aqueous feed stream having a pH in the range of about 1 to about 9.

11. The method of claim 9 wherein the solution includes one or more of sulfate, phosphate. borate, nitrate, bicarbonate, iron. carbonate. nitrite, silicate. sulfite, chloride, bromide, and iodide.

12. The method of claim 9 wherin the surface-activated titanium oxide has a capacity of about 4g of arsenic(V) per kg of surface activated titanium oxide at a concentration of about 10ppb arsenic(V) in the solution at a pH of about 6.5.

13. The method of claim 9 wherein the surface-activated titanium oxide has a capacity of about 9g of arsenic(V) per kg of surface activated titanium oxide at a concentration of about 100ppb arsenic(V) in the solution at. a pH of about 6.5.

14. The method of claim 9 wherein said contacting stan comprises the step of adsorbing arsenic in the form of one or booth of arsenic(III) and arsenic(V) to the surface activated titanium oxide so that, after completion of said adsorbing step, the surface-activated titanium oxide releases the arsenic to a concentration of less than 5ppm(w/w) of the arsenic in an aqueous extract prepared by the Toxic Characteristic Leaching Procedure.

15. The method of claim 9 wherein said contacting step comprises the step of adsorbing arsenic in the form of one or both of arsenic(III) and arsenic(V) to the surface-activated titantum oxrde so that, after completion of said adsorbing step, the surface-activated titanium oxide releases the arsenic to a concentration of less than 5ppm of the arsenic in an aqueous extract prepared by the Waste Extraction Test.

16. The method of claim 8 wherein at least 50% (w/w) of the solution consists of one or more organic chemicals.

17. The method of claim 16 wherin said organic chemicals comprise a glycol.

18. The method of claim 13 wherein said solution is at a pH of less than 6.

* * * * *

UNITED STATES PATENT AND TRADEMARK OFFICE
CERTIFICATE OF CORRECTION

PATENT NO. : 7,497,952 B2 Page 1 of 3
APPLICATION NO. : 11/176586
DATED : March 3, 2009
INVENTOR(S) : Meng Xiaoguang et al.

It is certified that error appears in the above-identified patent and that said Letters Patent is hereby corrected as shown below:

Column 5,
Line 63, replace "arsenic(I)" with --arsenic(III)--;

Column 17,
Line 41, insert --.-- after "...followed...";

Column 19,
Line 24, insert --,-- after "...claim 1";
Line 25, insert --,-- after "...column...";
Line 27, replace "race" with --face--;
Line 31, insert --,-- after "...claim 1...";
Line 32, replace "havinq" with --having--;
Line 36, insert --,-- after "...claim 1...";
Line 38, insert --,-- after "...claim 1...";
Line 40, replace "the" with --The--;
Line 40, insert --,-- after "...claim 1...";
Line 42, insert --,-- after "...claim 1...";
Line 48, insert --,-- after "...aluminum...";
Line 49, insert --,-- after "...cesium...";
Line 50, insert --,-- after "...copper...";
Line 50, replace "goid" with --gold--;
Line 50, insert --,-- after "...lead...";
Line 50, insert --,-- after "...manganese...";
Line 51, insert --,-- after "...silver...";
Line 52, insert --,-- after "...tin...";

Column 20,
Line 1, insert --,-- after "...phosphate...";
Line 1, insert --,-- after "...sulfite...";
Line 1, insert --,-- after "...sulfide...";
Line 8, insert --,-- after "...claim 8...";
Line 10, insert --,-- after "...(V)...";
Line 10, replace "comprsing" with --comprising--;
Line 12, replace "soluuon" with --solution--;
Line 13, insert --,-- after "claim 9";
Line 13, replace "where" with --wherein--;
Line 15, replace "iS" with --is--;

UNITED STATES PATENT AND TRADEMARK OFFICE
CERTIFICATE OF CORRECTION

PATENT NO. : 7,497,952 B2
APPLICATION NO. : 11/176586
DATED : March 3, 2009
INVENTOR(S) : Meng Xiaoguang et al.

It is certified that error appears in the above-identified patent and that said Letters Patent is hereby corrected as shown below:

Column 20,
Line 17, insert --,-- after "...claim 9...";
Line 18, insert --,-- after "...phosphate...";
Line 19, insert --,-- after "...iron...";
Line 19, insert --,-- after "...carbonate...";
Line 19, insert --,-- after "...silicate...";
Line 21, insert --,-- after "...claim 9...";
Line 21, replace "wherin" with --wherein--;
Line 21, insert a space after "...4...";
Line 24, insert a space after "...10...";
Line 25, insert --,-- after "...claim 9...";
Line 26, insert a space after "...9...";
Line 28, insert a space after "...100...";
Line 28, remove "." after "...at...";
Line 29, replace "stan" with --step--;
Line 31, replace "booth" with --both--;
Line 31, replace "surface activated" with --surface-activated--;
Line 34, insert a space after "...5...";
Line 37, insert --,-- after "...claim 9...";
Line 40, replace "titantum" with --titanium--;
Line 40, replace "oxrde" with --oxide--;
Line 42, insert a space after "...5...";

UNITED STATES PATENT AND TRADEMARK OFFICE
CERTIFICATE OF CORRECTION

PATENT NO. : 7,497,952 B2
APPLICATION NO. : 11/176586
DATED : March 3, 2009
INVENTOR(S) : Meng Xiaoguang et al.

It is certified that error appears in the above-identified patent and that said Letters Patent is hereby corrected as shown below:

Column 20,
Line 44, insert --,-- after "...claim 8...";
Line 46, insert --,-- after "...claim 16...";
Line 46, replace "wherin" with --wherein--;
Line 48, insert --,-- after "...claim 13..."; and
Line 49, insert --about-- after "...than...".

Signed and Sealed this

Fifteenth Day of December, 2009

David J. Kappos
*Director of the United States Patent and Trademark Office*